Dec. 18, 1934.  E. A. McBRIDE ET AL  1,984,751
METHOD OF MAKING HOLLOW VALVES
Filed Nov. 28, 1932   5 Sheets-Sheet 1

Inventors
Daniel Kelleher,
Eugene A. McBride,
Peter B. Lerch.
by Attys.

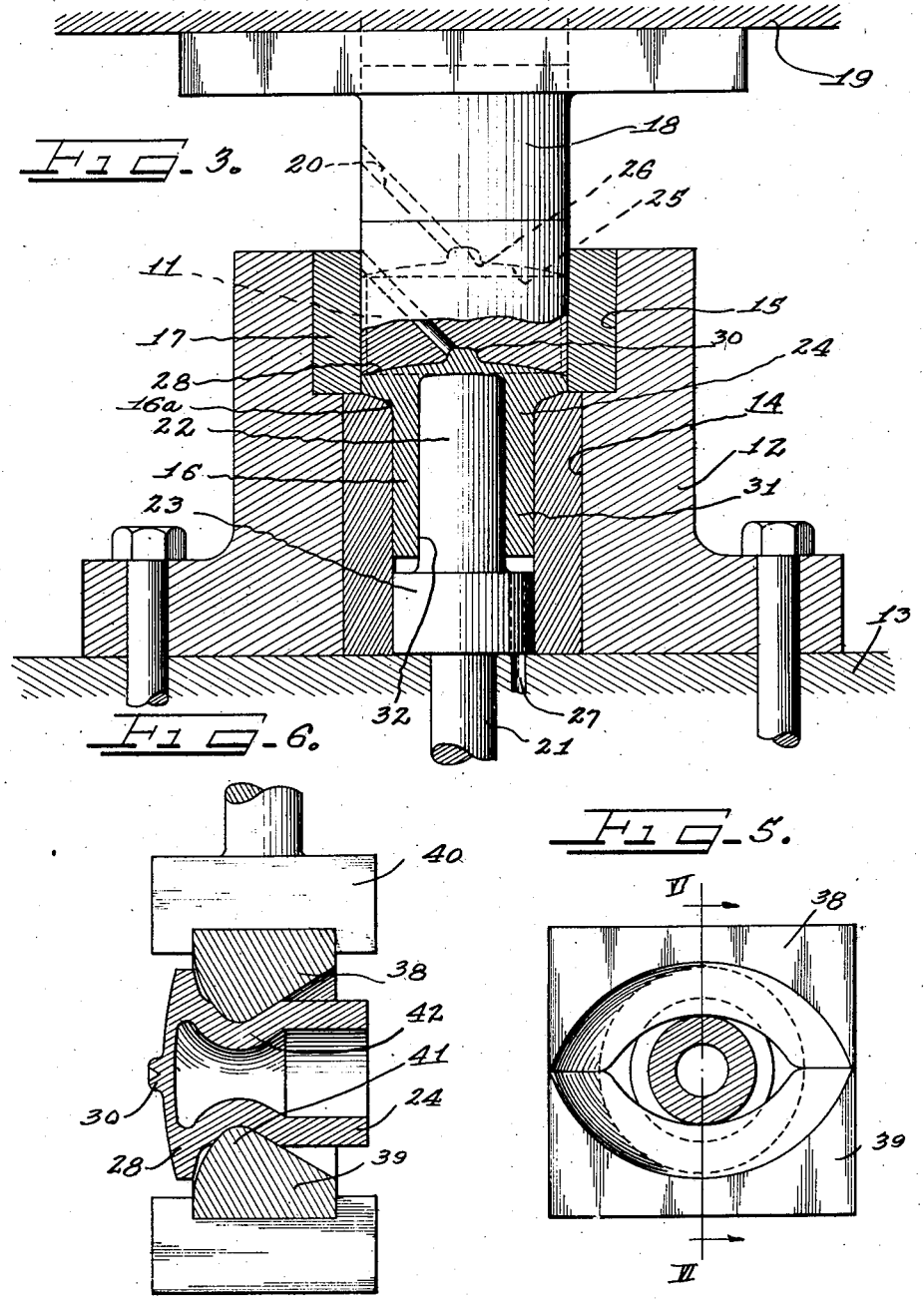

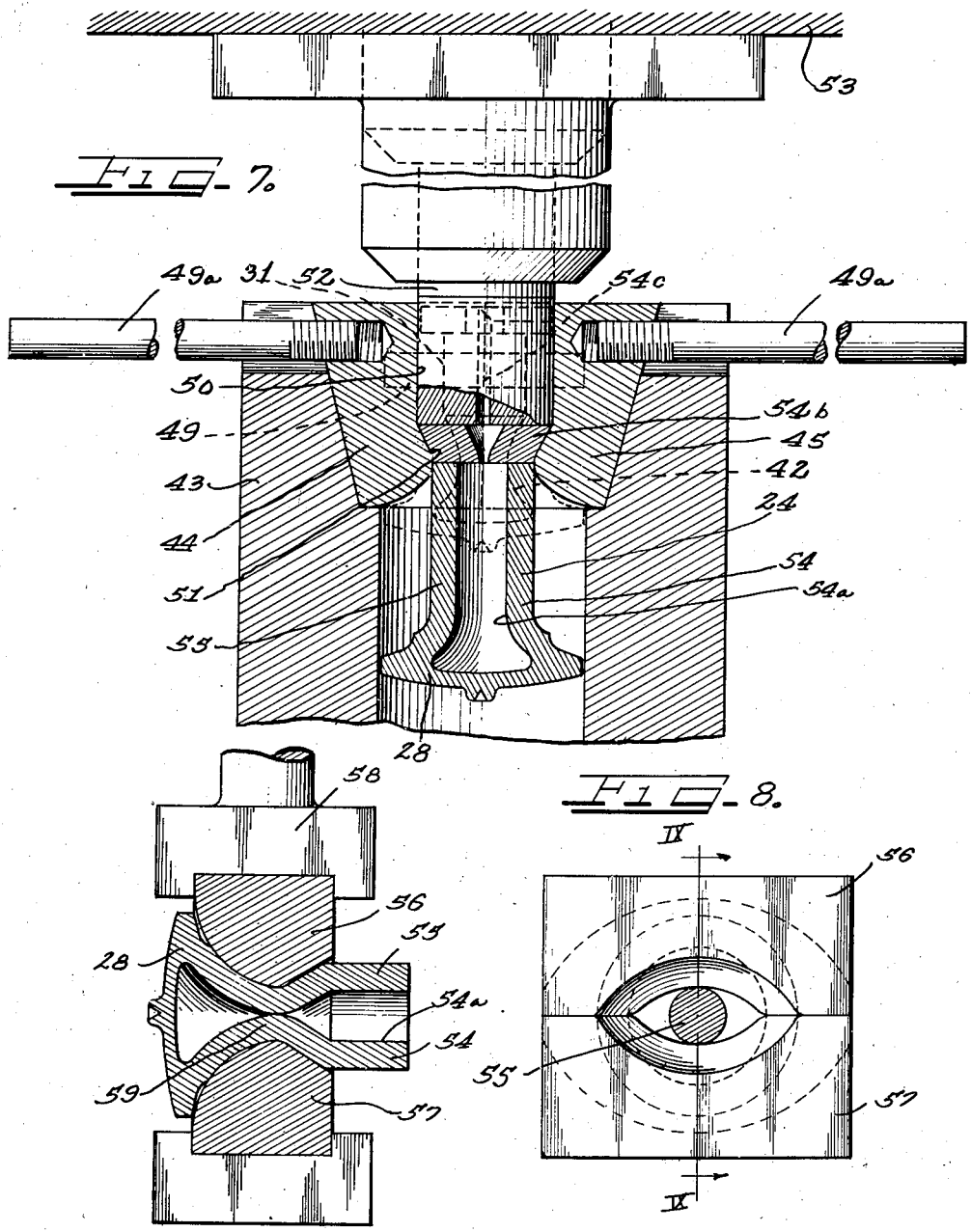

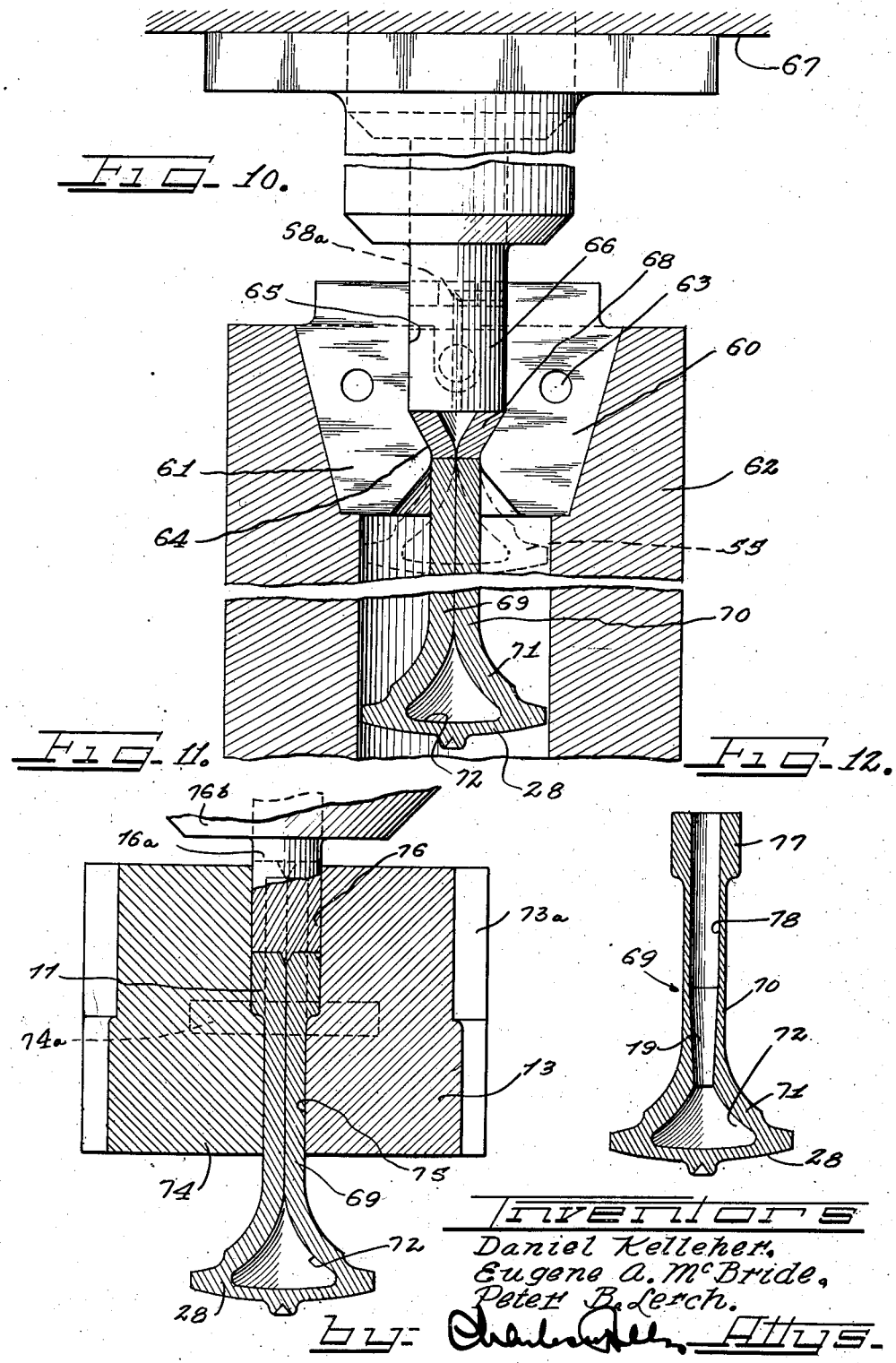

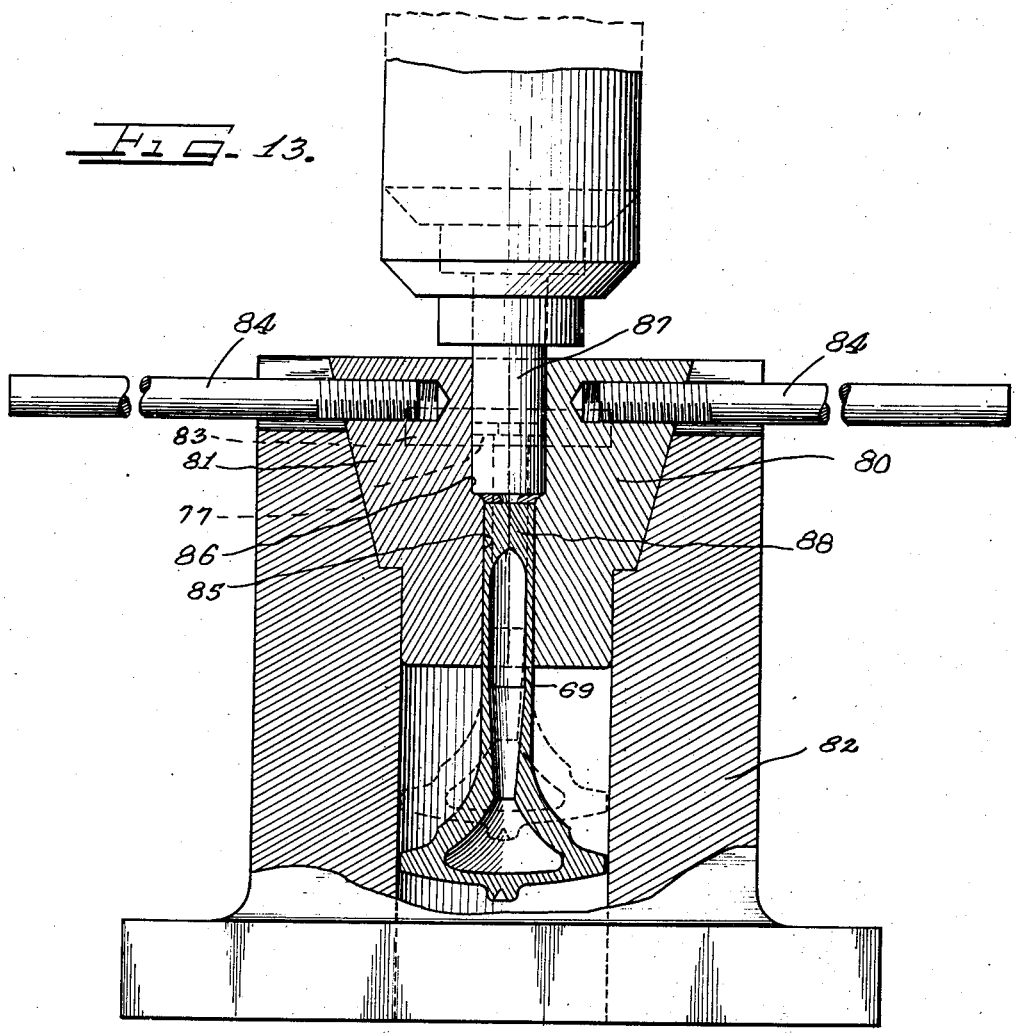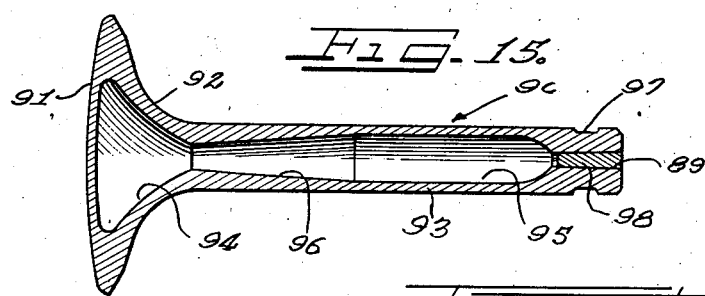

UNITED STATES PATENT OFFICE 1,984,751

METHOD OF MAKING HOLLOW VALVES

Eugene A. McBride, Daniel Kelleher, and Peter B. Lerch, Cleveland, Ohio, assignors to Thompson Products Incorporated, Cleveland, Ohio, a corporation of Ohio Application November 28, 1932, Serial No. 644,660

10 Claims. (Cl. 29—156.7)

This invention relates to valves and particularly to a process for making hollow poppet valves for internal combustion engines.

Because of the high temperatures attained in the operation of internal combustion engines, the making of suitable valves for such engines presents many problems. The high temperatures reached in the combustion chambers are such as to affect the composition of ordinary valves and to cause many disadvantageous effects thereto. Valves have been made of various alloys to improve the wear and heat resisting qualities thereof. Valves have also been made with hollowed stems which may be left as such to provide a dead air space therein or used as a passageway for circulating a stream of air or other fluid therethrough. Other valves have been hollowed and partially filled with a heat conducting medium to withdraw the heat from the valve head. The present invention relates to the latter types of valve.

It is an object of the present invention to provide a poppet valve for internal combustion engines having a hollow head and hollow stem, formed by a method which completely works and refines the grain of the metal.

It is a further object of this invention to provide a process of forming a hollow valve with an enlarged chamber in the head thereof without drilling the head.

It is a still further object of this invention to provide a process of making a hollow valve from a billet or slug of the valve metal.

It is a particular object of this invention to provide a process of making hollow valves wherein a billet of metal is formed into a cup or closed tube and then reworked to form a portion thereof into a valve stem leaving the remaining portion as a valve head with an enlarged chamber therein.

These and other objects of this invention will be apparent from the following description and appended claims.

This invention (in a preferred form) is illustrated in the accompanying drawings and hereinafter more fully described.

On the drawings:

Figure 3 is a vertical section through a set of dies on a punch press illustrating the first operation in the formation of a hollow valve from a billet of valve metal.

Figure 5 is an end elevational view of a set of hammer dies with the stock shown therein in cross section.

Figure 6 is a sectional view taken substantially along the line VI—VI of Figure 5.

Figure 7 is a sectional view of a set of extrusion dies and illustrates an extrusion step.

Figure 8 is an end elevational view of a set of hammer dies for performing the next step on the stock with the stock shown in cross section therein.

Figure 9 is a sectional view taken substantially along the line IX—IX of Figure 8.

Figure 10 is a vertical sectional view of another set of extrusion dies and illustrates the final extrusion of the stock.

Figure 11 is a vertical sectional view through a set of dies and illustrates an upsetting step in the formation of the valve stem.

Figure 12 is a sectional view of the stock after the operation illustrated in Figure 11 has been accomplished and after the stem has been drilled.

Figure 13 is a sectional view of the dies and stock illustrating the reworking of the end of the stem.

Figure 15 is a sectional view of the completed valve.

As shown on the drawings:

Figure 1:
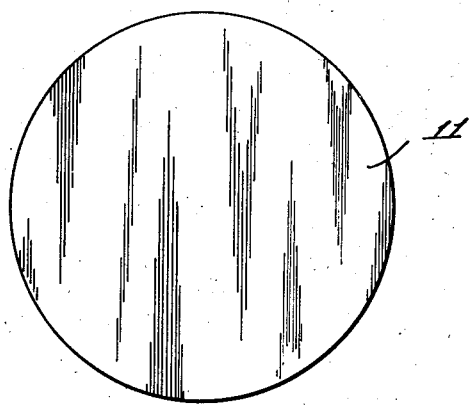
Figure 1 is a plan view of a metal billet from which the valve of this invention is formed.
Figure 2:
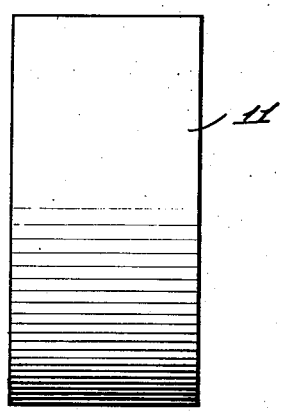
Figure 2 is an elevational view of the billet.

The valve of this invention is made from a short solid cylindrical billet or blank 11 of some suitable metal or metallic alloy of uniform composition. The metal used may be a tungsten steel or chromium steel or any other steel alloy having the necessary heat and corrosion resistant properties for use in the manufacture of automotive engine poppet valves. The billet 11 is illustrated in Figures 1 and 2.

The reference numeral 12 (Fig. 3) indicates a cylindrical die holder bolted to a platen 13 of a punch press. The holder or jaw 12 has a cylindrical bore 14 which is counterbored near its top as shown at 15. Cylindrical dies 16 and 17 are placed in the bore 14 and counterbore 15, respectively, of the holder 12. These dies 16 and 17 are hollow cylinders, the outside dimensions of which are such that they snugly fit within the bore and counterbore of the jaw 12. The bore of said die 17 is slightly larger than the diameter of the billet 11, as indicated in dotted lines in Fig. 3. The bore of the die 16 is considerably smaller than the bore of die 17 to thereby effect a reduction in diameter of a portion of the billet 11 as will later be explained. Said die 16 is provided with a suitably rounded annular shoulder 16a which joins the inner cylindrical wall surfaces of said dies 17 and 16 and defines the extrusion orifice.

A ram 18 is attached to the head 19 of the punch press. The ram 18 is of substantially the same cross sectional dimensions as the bore of the die 17.

A rod 21 extends upwardly through an aperture provided therefor in the platen 13 of the press. The rod 21 is aligned with the ram 18 and terminates in a cylindrical stake 22 of somewhat smaller diameter than the bore of the die 16 and arranged concentrically therewith. The stake 22 extends a slight distance above the extrusion shoulder 16a of the die 16 and the lower end of the stake is provided with an integral collar 23, which during the operating stroke of the ram 18 rests on the platen 22 to prevent downward displacement of the stake.

The ram 18 is provided with a concave lower face 25 having a central recess 26 for shaping the billet, as will later be explained. A relief passageway 20 is provided in the ram 18 and a similar passageway 27 is provided in the collar 23 and platen 13. These serve to prevent the building up of air pressure during the forming operation.

The dies, described above, are used for forming the billet 11 into the thimble shaped member illustrated in full lines at 24 in Fig. 3. In operation, the billet 11 is heated to a forging temperature and placed in the die 17. The ram 18 is brought down against the billet 11 to force the metal thereof to flow outwardly to fill the bore of the die 17. Continued pressure of said ram 18 causes a portion of the metal of said billet 11 to be extruded into the die 16 and about the stake 22, which forms a cavity in the stock 24. The concave operating face 25 of the ram 18 serves to form a convex head 28 on the work with the recess 26 forming a boss 30 thereon which later serves to center the work or stock 24 in its passage through the various dies used subsequently for the other steps in our process.

The rod 21 is operatively associated with the head 19 of the press to move upwardly at the upstroke thereof, to eject the stock 24 from the die 12.

The stock 24 at this stage in our process has a convex head 28 and a hollow shank or body portion 31. The head is of practically the same diameter as that desired in the completed valve head. The body portion 31 is provided with a cylindrical recess or cavity 32 which extends the full length thereof and for a short distance into the metal of said head 28.

Figure 4:
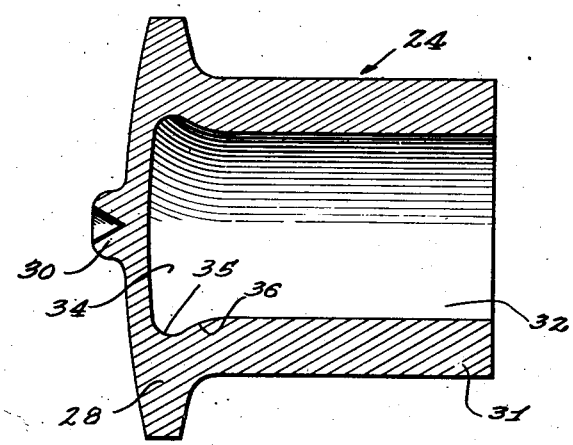
Figure 4 is a sectional view of the metal stock which is subsequently extruded to form the valve.

The die 16 and stake 22 are so proportioned that the wall thickness of the shank 31 is approximately equal to the desired radius of the finished valve stem. The stock 24 after the first forging step is preferably machined or reamed to enlarge the recess in the head portion, as shown at 34 (Figure 4). The annular wall surface of the head cavity 34 is preferably curved as at 35 to give the head cavity the size desired in the finished valve. The wall surface between the head cavity and the shank cavity is also curved as at 36 to make a smooth inner wall from the enlarged head chamber to the recess extending through the body of the stock. This latter curve 36 serves to determine the curvatures imparted in the subsequent forging operations and causes the head cavity to conform in wall contour with that desired in the finished valve.

The next operation on the stock 24 is performed by a set of hammer dies 38 and 39 (Figures 5 and 6). These dies are mounted in a press 40, illustrated fragmentarily in Figure 6. Each die has a semi-elliptical working surface which is convex in cross section, as shown at 41. The stock 24 is reheated to forging temperature and placed between these dies. A succession of blows is given by the dies while the stock is being revolved manually or by an apparatus (not shown). This operation forms a constriction 42 in the body 31 of the stock just back of the head 28 and serves to prepare the work for a subsequent extrusion operation.

Figure 7 illustrates a set of dies used in the next extrusion step. A die holder 43 is supported on the platen of a press (not shown) and serves to hold complementary dies 44 and 45. Said holder 43 is provided with a cylindrical bore of sufficient diameter to freely admit the enlarged head 28 of the stock 24. The dies 44 and 45 are held in alignment by dowel pins 49. They are also provided with handles 49a for removing them from the holder.

Each of the dies 44 and 45 has a concave face and a protruding face therebeneath so that when the dies are mated they provide a cylindrical work receiving opening 50 terminating in a restricted throat 51. The opening 50 is of such size as to receive the body portion 31 of the stock while the throat 51 securely contacts the constriction 42 thereof. The stock 24, which has been heated to forging temperature, is placed in inverted position between the dies so that the head 28 is located in the bore of the die holder 43 with the body 31 extending between the dies. The upper portion of the body 31 is forced through the dies by a ram 52 connected to the head 53 of the press.

A soft metal collar 54b is placed between the ram 52 and the stock 24. The collar 54b is forced partially through the restricted throat of the die and is distorted thereby and serves to force the entire body portion 31 through the throat 51 of the extrusion dies. The collar 54b has a central opening which communicates with a passageway 54c in the ram 52 to permit trapped air to be discharged.

The position of the stock 24 prior to extrusion is shown in dotted lines (Figure 7) and after extrusion is shown in full lines. It will be seen that after extrusion the convex head 28 remains unaffected while the body portion of stock 55 is drawn down to the diameter of the previously restricted portion 42 to present a uniform cylindrical shank 54 having a bore 54a.

After the first extrusion, the stock 55 is put through a number of successive hammering and extrusion operations similar to those above described. Each time, the shank 54 of the stock is drawn out a little longer than in the preceding extrusion.

Figures 8, 9, and 10 illustrate the final hammering and extrusion steps.

In Figure 8, there is shown a set of hammer dies 56 and 57 which are similar to those shown in Figure 5. These dies are mounted in a press shown at 58. They are adapted to form a restriction 59 in the stem portion 54 of the stock which is such as to close the bore thereof.

The stock 55 is then placed in the complementary extrusion dies 60 and 61 (Figure 10) which are held together in a jaw 62 by dowel pins 63. The jaw 62 is cylindrical in shape and has a bore sufficiently large to pass the convex head 28 of the stock 55. The dies 60 and 61 have projecting portions which together form a restricted throat 64 terminating the cylindrical bore 65 thereabove formed by the semi-cylindrical concave faces of the dies.

The stock 55 is shown in its original position by the dotted lines in Figure 10. The stock 55 is forced through the dies by the ram 66 mounted on the head 67. As in the preceding extrusion, a soft metal piece 68 is used to force the stock completely through the throat portion of the dies. The member 68 has an aperture therethrough aligned with a passageway 68a in the ram for permitting the exhaust of air from the stock.

The stock or intermediate 69, at this stage of the process, comprises the convex head 28 formed in the original stamping step and a solid stem portion 70. A throat 71 tapers from the head to the stem and surrounds an enlarged chamber 72 which remains in the head portion.

Figure 11 illustrates the apparatus for performing the next succeeding step in our process. Dies 73 and 74 are mounted in a holder 73a. The faces of the dies are concave and the dies are held in complementary position by dowel pins 74a to form a cylindrical opening 75 for receiving the stock 69. The upper portions of the faces of the dies are cut deeper to form a larger cylindrical opening 76.

A ram 76a is attached to the head 76b of the press. The ram 76a is equal in diameter to the cylindrical opening 76 between the dies, and is aligned therewith.

The stock 69 is reheated and placed in the dies 73 and 74, taking the position shown in dotted lines in Figure 8. The walls of the cylindrical opening 75 firmly grip the stock and hold it against displacement while the ram is brought down against the end of the work. The ram upsets a portion of the stem of the work, as indicated at 77 and as shown in full lines in Figure 8.

The stock 69 is removed from the dies and a recess 78 (Figure 12) is drilled in the stem thereof. The recess 78 is uniformly cylindrical and concentric with the stem throughout the stem end thereof but tapers toward the head end, as shown at 79. The recess extends clear through the stem of the valve and meets the chamber 72 to leave a passageway from the head through the tip end of the stem.

Figure 13 illustrates the set of dies used in the final extrusion step. As shown in this figure, a pair of dies 80 and 81 are held in alignment by means of dowel pins 83 in a holder 82, which is mounted on a platen of a press (not shown). Handles 84 are provided for removing the dies from the holders. The dies have complementary semi-cylindrical concave faces, cut deeper at their upper portions, to form the concentric cylindrical bores 85 and 86. The bores are of diameters sufficient to snugly receive the stem 70 and enlargement 77 of the valve, respectively. A ram 87, attached to the head of the punch press, operates in the bore 86.

Figure 14:
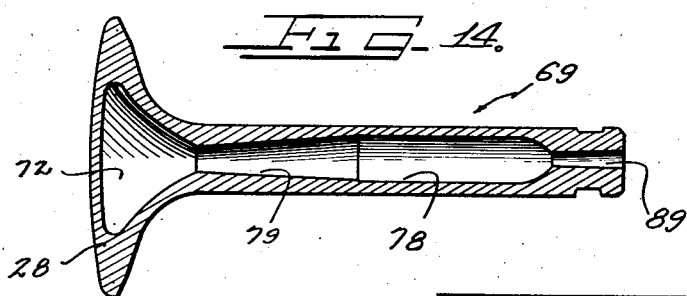
Figure 14 is a sectional view of a valve showing the head and stem machined and drilled.

The ram 87 is brought down against the valve and forces the end portion 77 thereof through the restricted opening 85 to thereby swage the metal of said end 77 of the valve to form a thickened wall portion 88 in the end of the stem. This operation practically closes the stem end of the valve but a tapered bore 89 of small diameter is drilled therethrough, as shown in Figure 14.

It will be seen that we have provided a method of making a hollow valve wherein a cylindrical billet of metal is formed into a finished hollow valve by a series of forging operations which are simple in nature. This method is briefly summarized as follows:

The billet 11 is initially formed with a diameter slightly less than the desired diameter of the head of the finished valve. This billet is then heated to a forging temperature and placed in the stamping dies 16 and 17 illustrated in Figure 3. The operation performed on the billet in these dies serves to enlarge an end portion thereof to form a head 28, which is subsequently machined to form the completed head of the valve. The remainder of the metal of the billet is extruded to form the longer and narrower cylindrical body or shank 31 integral with the head. The stake 22 extending upwardly through the die 16 forms the recess 32 which extends through the body of the stock and for a slight distance into the head.

It is preferable, at this stage of the process, to anneal the stock. The recess 32 is machined or milled out (Figure 4) at the head end of the stock to form the enlarged head chamber which is subsequently maintained through to the finished valve. The curve 36 from the enlarged chamber to the bore in the stem determines the curvature of the neck walls throughout the various subsequent operations.

The stock is next placed between a set of hammer dies (Figures 5 and 6). These dies serve to form a constriction in the body portion of the stock adjacent the head thereof. The stock is centered and rotated in the hammer dies while a series of blows are given thereto to form this constriction. It is to be observed that the faces of the hammer dies are such as to impart a curve from the constriction to the body of the stock which gives the proper extruding angle for the succeeding operation. The other portions of the die faces serve to maintain the proper curvature of the head and neck of the stock.

The stock is next extruded in the dies shown in Fig. 7. After the first extrusion the reshaped stock is again heated, annealed, reheated and put through another hammering and another extrusion operation. It is important in each of these steps to produce an extrusion angle in the stock which is not so great as to cause damage to the grain of the metal. For this reason, it may be necessary to perform a number of hammering and extrusion steps on each piece of stock to gradually reduce the body thereof to form the valve stem. However on the smaller valves, the stock may be reduced to stem size in the two extrusions illustrated. In any case as the stock is passed through the last set of hammer dies (Figs. 8 and 9), the constriction made in the body thereof is such as to completely close the bore. In the extrusion dies (Fig. 10) following this, a solid stem is formed.

Subsequently the stock, which is now formed to the approximate shape of the completed valve, is placed in another set of dies (Fig. 11) and is upset. Next the tip end of the stem thereof is upset. Next the stem is bored longitudinally (Fig. 12) to form a passageway communicating with the head chamber. The stock is then swaged (Fig. 13) to form the stem enlargement into a restriction within the stem. Later the valve is machined and a tapered hole (Fig. 14) is bored through the stem. This hole may be later closed by a plug.

The completed valve is shown in Fig. 15. The valve, illustrated as a whole by the reference numeral 90, corresponds to the stock 69 and has a convex head 91, throat 92, and stem 93. The head is provided with a chamber 94 and the stem with a recess 95 which is uniformly cylindrical toward the tip end of the valve but tapers as shown at 96 toward the head end of the valve where it communicates with the head chamber 94. The aligning boss 30 of the stock is machined off so that the valve presents a smooth convex head 91.

The tip end of the valve is machined as illustrated at 97 and the recess 89 is filled with a tapered plug 98 which is force-fitted therein.

It will be understood, that the recess extending through the valve may be left as a dead air space, or that the valve chamber may be partially filled with a fusible cooling medium such as a salt or sodium. Also, it will be understood that the drilling of the valve stem may be eliminated to form a valve having a hollow chamber in its head only instead of the valve shown in Figure 11 which has the chamber in the head and a recess in the stem communicating therewith.

It will be seen that the method of our invention provides an easy and economical method of manufacturing hollow valves. Moreover, the method can be used to form a valve having an enlarged chamber in its head portion and does not necessitate the use of an expansion drill for forming such a chamber. It is one of the features of this invention that the chamber originally formed in the stock is maintained throughout the succeeding operations and forms a part of the chamber in the finished valve. Furthermore, the method herein disclosed makes possible the maintenance of the originally formed head chamber without the necessity of providing a core metal or filler material.

The valve formed by this method, is readily adapted for use in high compression automobile engines and particularly is adapted for airplane use. The valve represents an advance, in itself, over other valves of this general type, as by our process of manufacturing the valve, the grain of the metal is refined and the metal of the valve so forged and worked that the valve is less apt to become warped, even in case no heat conducting medium were used therewith.

It will be understood that changes may be made within the scope of this invention in connection with steps of the method above described. For instance, in the combined punching and extrusion step to form a headed thimble-shaped member, it is obvious that the stake 22 may be omitted and the recess 32 drilled out subsequently and machined to give an intermediate work piece identical with the work 24 illustrated in Figure 4.

We are aware that numerous details of the process may be varied through a wide range without departing from the principles of this invention, and we, therefore, do not purpose limiting the patent granted hereon otherwise than necessitated by the prior art.

We claim as our invention:

1. The method of making a hollow valve which comprises extruding a solid metal billet to form a headed member having a hollow extension thereon of smaller diameter than the head and working said extension to reduce the diameter thereof and form a solid stem while leaving a cavity in said head.

2. The method of making a hollow valve, which comprises punching out a solid metal billet to form a headed member having a hollow shank of smaller diameter than said head and without substantially changing the diameter of said head reducing the diameter of said shank to close said hollow shank while leaving a cavity at said head end.

3. The method of making a hollow valve, which comprises punching out a solid metal billet to form a head of substantially the same diameter as that desired in the finished valve head and a hollow shank of smaller diameter, successively reducing the diameter of said shank locally adjacent said head by collapsing the walls thereof and extruding the remaining portion of said shank to the diameter of said locally reduced portion, thereby forming a cavity in said head end and an elongated solid shank.

4. The method of making a hollow valve which comprises stamping a cylindrical metal billet to form a member having a head portion of substantially the size and shape of the completed valve head and a body portion of smaller diameter having a large cylindrical recess extending therethrough and into the head portion thereof, reducing said body portion to form a solid valve stem while maintaining the portion of the recess extending into the head as a head chamber and drilling a recess through said stem to communicate with the chamber in the head.

5. The method of forming a one-piece seamless hollow valve, which comprises shaping a solid metal billet to form a hollow cylindrical member with an enlarged head thereon, reworking the intermediate portion of said member to decrease the diameter thereof and leave a hollow chamber adjacent the head, reworking the open end portion of the metal stock to reduce the diameter thereof to the diameter of the intermediate portion to thereby form a valve having a hollow chamber in its head portion and a solid seamless stem, and drilling a recess through said solid stem to communicate with the head chamber.

6. The method of making a hollow valve which comprises stamping a metal billet to form a member having a head portion of substantially the size and shape of the desired valve head and a hollow cylindrical body portion of smaller diameter extending therefrom having a recess extending therethrough and for a short distance into said head portion, decreasing the cross-sectional area of a portion of said body portion adjacent the head thereof, reworking the remainder of the body of the stock to reduce it to the cross-sectional area of the portion adjacent the head thereof to form a blank having a head with a hollow chamber therein and a long seamless solid stem integral with the head, upsetting the end of the stem, drilling a passageway through said stem to communicate with the chamber in the head and swaging the end of the stem to form a restriction substantially closing the end of the stem passageway.

7. The method of making a hollow valve which comprises extruding a cylindrical metal billet having a diameter approximately the size of the desired valve head to form a hollow headed member with a hollow shank of smaller diameter than said headed member, reducing the diameter of the shank portion to maintain the hollow recess in the headed portion and to form a long thin solid stem integral with the head and boring a recess in said stem axially thereof.

8. The method of making a hollow valve which comprises stamping a solid cylindrical billet to form a member having a domed head portion substantially the diameter of the desired valve head and a hollow body portion of smaller diameter than the head portion with a recess extending through said body and into said head, drilling that portion of the recess extending into the head to form an enlarged head chamber and reducing the diameter of the body portion while maintaining the chamber in the head to form an elongated valve stem.

9. The method of making a hollow valve which comprises extruding a billet to form a blank having a hollow shank portion and an enlarged domed head portion, collapsing the walls of said shank portion adjacent said head to confine a cavity in the head and drawing the remaining portion of the shank to the diameter of the collapsed portion.

10. The method of making a hollow valve which comprises extruding a solid metal billet to form a headed blank having a hollow shank portion of smaller diameter than the head, die forging the shank adjacent the head portion to define the contour of the undersurface of the valve head and to define a cavity in the head and drawing the remaining portion of the shank to form a solid valve stem.

EUGENE A. McBRIDE.
DANIEL KELLEHER.
PETER B. LERCH.